(12) United States Patent
Shimizu et al.

(10) Patent No.: US 11,333,245 B2
(45) Date of Patent: May 17, 2022

(54) OIL CONTROL RING AND SPACER EXPANDER

(71) Applicant: KABUSHIKI KAISHA RIKEN, Tokyo (JP)

(72) Inventors: Hiroshi Shimizu, Kashiwazaki (JP);
Satoshi Koizumi, Kashiwazaki (JP);
Kenichi Sudou, Kashiwazaki (JP);
Shigeru Tokunaga, Kashiwazaki (JP);
Yuichiro Takezawa, Kashiwazaki (JP)

(*) Notice: Subject to any disclaimer, the term of this patent is extended or adjusted under 35 U.S.C. 154(b) by 0 days.

(21) Appl. No.: 17/045,181

(22) PCT Filed: Mar. 29, 2019

(86) PCT No.: PCT/JP2019/014225
§ 371 (c)(1),
(2) Date: Oct. 5, 2020

(87) PCT Pub. No.: WO2019/194104
PCT Pub. Date: Oct. 10, 2019

(65) Prior Publication Data
US 2021/0164566 A1    Jun. 3, 2021

(30) Foreign Application Priority Data
Apr. 6, 2018  (JP) .............................. JP2018-073679

(51) Int. Cl.
*F16J 9/06*   (2006.01)
*F16J 9/12*   (2006.01)

(52) U.S. Cl.
CPC ................. *F16J 9/068* (2013.01); *F16J 9/12* (2013.01); *F16J 9/064* (2013.01); *F16J 9/067* (2013.01)

(58) Field of Classification Search
CPC .... F16J 9/064; F16J 9/065; F16J 9/066; F16J 9/067; F16J 9/068; F16J 9/069; F16J 9/12; F16J 9/20; F16J 9/203
See application file for complete search history.

(56) References Cited

U.S. PATENT DOCUMENTS 2,635,022 A * 4/1953 Shirk ...................... F16J 9/066
                                              277/481
2,676,076 A * 4/1954 Hamm ..................... F16J 9/066
                                              277/480
(Continued)

FOREIGN PATENT DOCUMENTS

DE          1475793       1/1969
EP          2365233       9/2011
(Continued)

OTHER PUBLICATIONS

International Search Report dated Jul. 2, 2019 for PCT/JP2019/014225.
(Continued)

*Primary Examiner* — Nicholas L Foster
(74) *Attorney, Agent, or Firm* — Soei Patent & Law Firm

(57) ABSTRACT

An oil control ring according the present disclosure includes a pair of side rails, and a spacer expander disposed between the pair of side rails. The spacer expander includes a plurality of sets and each set includes a lug part and a rail facing part. For each set, the lug part is in contact with an inner circumferential surface of either of the pair of the side rails, and the rail facing part is provided adjacent to the lug part and faces a side surface of either of the pair of the side rails. The lug part satisfies a following condition (1):

$W/H \geq 1.5$  (1)

In condition (1), W indicates a width of the lug part at a position 0.05 mm away from a highest position of the lug
(Continued)

part in a direction towards the rail facing part, and H indicates a height difference between a highest position of a region on the rail facing part adjacent to the lug part and the highest position of the lug part.

16 Claims, 16 Drawing Sheets

(56) References Cited

U.S. PATENT DOCUMENTS

| | | | | |
|---|---|---|---|---|
| 2,770,512 A * | 11/1956 | Hamm | | F16J 9/069 277/481 |
| 2,785,030 A * | 3/1957 | Olson | | F16J 9/063 277/477 |
| 2,893,801 A * | 7/1959 | Heid, Jr. | | F16J 9/069 277/481 |
| 2,904,377 A * | 9/1959 | Endres | | F16J 9/068 277/480 |
| 3,172,672 A * | 3/1965 | Marien | | F16J 9/069 277/479 |
| 3,190,662 A * | 6/1965 | Mayfield | | F16J 9/069 277/478 |
| 3,323,807 A | 6/1967 | Vanderbilt, Jr. | | |
| 3,356,375 A * | 12/1967 | Paule | | F16J 9/145 277/435 |
| 3,381,971 A * | 5/1968 | Mayhew | | F16J 9/066 277/481 |
| 3,442,519 A * | 5/1969 | Hamm | | F16J 9/066 277/477 |
| 3,656,767 A * | 4/1972 | Matsumoto | | F16J 9/069 277/481 |
| 3,741,569 A * | 6/1973 | Mayhew | | F16J 9/069 277/477 |
| 4,194,747 A * | 3/1980 | Nisper | | F16J 9/069 267/1.5 |
| 4,548,416 A * | 10/1985 | Maeda | | F16J 9/069 267/1.5 |
| 5,718,437 A * | 2/1998 | Tanaka | | F16J 9/066 277/443 |
| 5,788,246 A * | 8/1998 | Kuribayashi | | F16J 9/061 277/463 |
| 7,044,472 B2 * | 5/2006 | Takahashi | | F16J 9/067 277/434 |
| 7,854,191 B2 * | 12/2010 | Kariya | | F16J 9/067 92/253 |
| 9,303,765 B2 * | 4/2016 | Kunimoto | | F16J 9/066 |
| 9,410,625 B2 * | 8/2016 | Nakazawa | | F16J 9/068 |
| 9,458,933 B2 * | 10/2016 | Ayuzawa | | F16J 9/068 |
| 10,557,551 B2 * | 2/2020 | Shimizu | | F02F 5/00 |
| 2003/0090066 A1 * | 5/2003 | Takahashi | | F16J 9/067 277/434 |
| 2006/0049583 A1 * | 3/2006 | Lu | | F16J 9/067 277/434 |
| 2009/0013866 A1 * | 1/2009 | Kariya | | F16J 9/067 92/172 |
| 2011/0221141 A1 * | 9/2011 | Ayuzawa | | F16J 9/068 277/434 |
| 2014/0265149 A1 * | 9/2014 | Nakazawa | | F16J 9/12 277/467 |
| 2015/0184747 A1 * | 7/2015 | Kunimoto | | F16J 9/066 277/473 |
| 2015/0240945 A1 * | 8/2015 | Favaron | | F16J 9/26 277/442 |
| 2018/0051806 A1 | 2/2018 | Murata et al. | | |
| 2018/0094726 A1 * | 4/2018 | Shimizu | | F16J 9/20 |
| 2020/0124174 A1 * | 4/2020 | Mochizuki | | F02F 5/00 |

FOREIGN PATENT DOCUMENTS

| | | |
|---|---|---|
| EP | 2767743 | 8/2014 |
| FR | 1211084 | 3/1960 |
| JP | 2003-083450 | 3/2003 |
| JP | 2011-185383 | 9/2011 |
| JP | 2015-124805 | 7/2015 |
| WO | 2016/159269 | 10/2016 |

OTHER PUBLICATIONS

International Preliminary Report on Patentability with Written Opinion dated Oct. 15, 2020 for PCT/JP2019/014225.

Extended Search Report in corresponding European Application No. 19781732.3 dated Nov. 25, 2021.

* cited by examiner

OIL CONTROL RING AND SPACER EXPANDER

CROSS-REFERENCE TO RELATED APPLICATIONS

This application is a 35 U.S.C. § 371 national phase application of PCT/JP2019/014225, filed on Mar. 29, 2019, which claims priority to Japanese Patent Application No. P2018-073679, filed on Apr. 6, 2018.

TECHNICAL FIELD

The present disclosure relates to a spacer expander and an oil control ring including the spacer expander.

BACKGROUND ART

An oil control ring is for forming an appropriate oil film on an inner surface of a cylinder bore and plays a role of scraping off excessive engine oil according to reciprocation of a piston. As an oil control ring, an aspect called a three-piece oil ring is known (see Patent Literature 1 and 2). The three-piece oil ring includes a pair of side rails and a spacer expander disposed therebetween. The spacer expander includes lug parts with which inner circumferential surfaces of the side rails are in contact, and side rail support parts lacing side surfaces of the side rails (see FIGS. 1 and 2 of Patent Literature 1).

CITATION LIST

Patent Literature

[Patent Literature 1] PCT international Publication No. WO 2016/159269
[Patent Literature 2] European Patent Application, Publication No. 2365233

SUMMARY OF INVENTION

Technical Problem

In recent years, internal-combustion engines represented by automobile engines have been designed to have a higher output, improvement in fuel efficiency, and reduction in emissions from a viewpoint of environmental protection. Along with this, conditions under which oil control rings are used are becoming stricter. For example, from) a viewpoint of a higher output, an engine rotation speed tends to be higher than that in the past, and an on control ring reciprocates in a cylinder bore at a higher speed. Thereby, a lug part easily becomes worn due to contact with side rails. When surfaces in contact with side rails become worn in a lug part, a surface pressure of the side rails with respect to an inner wall of the cylinder bore decreases, and an oil scraping performance deteriorates. Also, from a viewpoint of improving fuel efficiency, engine oil having higher lubricity tends to be used, and a phenomenon in which relative positions of the side rails and the spacer expander are shifted in a circumferential direction tends to occur. This also causes wear of the lug part due to the side rails and deterioration of the oil scraping performance.

An objective of the present disclosure is to provide an oil control ring in which wear of a lug part due to contact with a side rail can be reduced, and a spacer expander applicable thereto.

Solution to Problem

An oil control ring according to the present disclosure includes
a pair of side rails, and a spacer expander disposed between the pair of side rails, in which the spacer expander includes a plurality of lug, parts with which inner circumferential surfaces of the side rails are in contact, and a plurality of rail facing parts provided adjacent to the lug parts and facing side surfaces of the side rails, and all or at least a part of the plurality of lug parts satisfy a condition represented by the following inequality (1).

$$W/H \geq 1.5 \tag{1}$$

In inequality (1), W indicates a width (unit: mm) f each of the lug parts at a position 0.05 mm away from a highest position of the lug part in a direction of each of the rail facing parts, and H indicates a height deference (unit: mm) between a highest position of a region on the rail facing part adjacent to the lug part and the highest position of the lug part.

According to an evaluation test of the present inventors, a spacer expander including a lug part having a W/H value of 1.5 or more can reduce an amount of wear of the lug part compared to one having a value of less than 1.5 (see FIG. 16). Also, since a dimensional ratio is configured such that a height of the lug part compared to a width of the lug part is limited, this is also suitable from a viewpoint of a strength and processability of the lug part. An upper limit of the W/H value may be, for example, 5.0 from a viewpoint of a tension generated in the spacer expander.

The rail facing part preferably has a recess or a raised portion formed to extend in a radial direction. When such a configuration is employed, engine oil adhering to the side rail can easily flow quickly. Therefore, an amount of sludge remaining between the inner circumferential surface of the side rail and the lug part (sliding surface) can be reduced compared to conventional cases, and aggressive wear due to presence of foreign matter contained in engine oil can be sufficiently reduced.

It is preferable that the rail facing part have a flat portion with which a side surface of each of the side rails is in contact, and the flat portion be formed along an edge portion on an outer circumferential side of the spacer expander. When the rail facing part has the above-described flat portion, and a height of the flat portion is formed to be lower than that of the lug part and higher than that of a region (the recess or the raised portion) of the rail facing part adjacent to the lug part, a gap is formed between the region of the rail facing part adjacent to the lug part and the side rail in a state in which the side rail is in contact with the flat portion. Thereby, a flow velocity of the engine oil is promoted, an amount of sludge remaining between the inner circumferential surface of the side rail and the lug part (sliding surface) can be reduced compared to conventional cases, and aggressive wear can be further reduced.

The lug part preferably includes a protruding part formed to extend in a thickness direction of the spacer expander on a surface thereof with which the inner circumferential surface of the side rail is in contact. When such a configuration is employed, a phenomenon in which relative positions of the side rail and the spacer expander are shifted in the circumferential direction can be sufficiently reduced. That is, the protruding part functions as a slip resistance with respect to the side rail. It is preferable that at least five protruding parts be formed to be aligned in one lug part.

The spacer expander may be one that has been subjected to a surface treatment from a viewpoint of enhancing wear resistance, resistance to adhesion of sludge, or the like.

As described above, the oil control ring according to the present disclosure can sufficiently reduce wear of the lug part, and thus is applicable to a diesel engine. Although conventional three-piece ad rings are widely applied to gasoline engines, they are generally not applied to diesel engines due to insufficient wear resistance of the lug part. This is because, since diesel engines are lubricated in a state in which a large number of hard particles such as carbon generated during combustion are contained in engine oil, wear of each portion is prominent compared to the case of gasoline engines, the lug part of the spacer expander also wears at relatively early stage, and an oil scraping performance deteriorates easily.

Advantageous Effects of Invention

According to the present disclosure, an oil control ring in which wear of the lug part due to contact with the side rail can be reduced, and a spacer expander applicable thereto are provided.

BRIEF DESCRIPTION OF DRAWINGS

FIGS. 10B and 10C are cross-sectional views along line A-A in FIG. 10A, in which FIG. 10B is a cross-sectional view illustrating an aspect in which the protruding part is high, and FIG. 10C is a cross-sectional view illustrating an aspect in which the protruding part is low.

DESCRIPTION OF EMBODIMENTS

Hereinafter, a plurality of embodiments of the present disclosure will be described in detail with reference to the accompanying drawings. In the description of the drawings, elements which are the same will be denoted by the same reference signs and duplicate description thereof will be omitted. The present invention is not limited to the following embodiments.

First Embodiment

Figure 1:
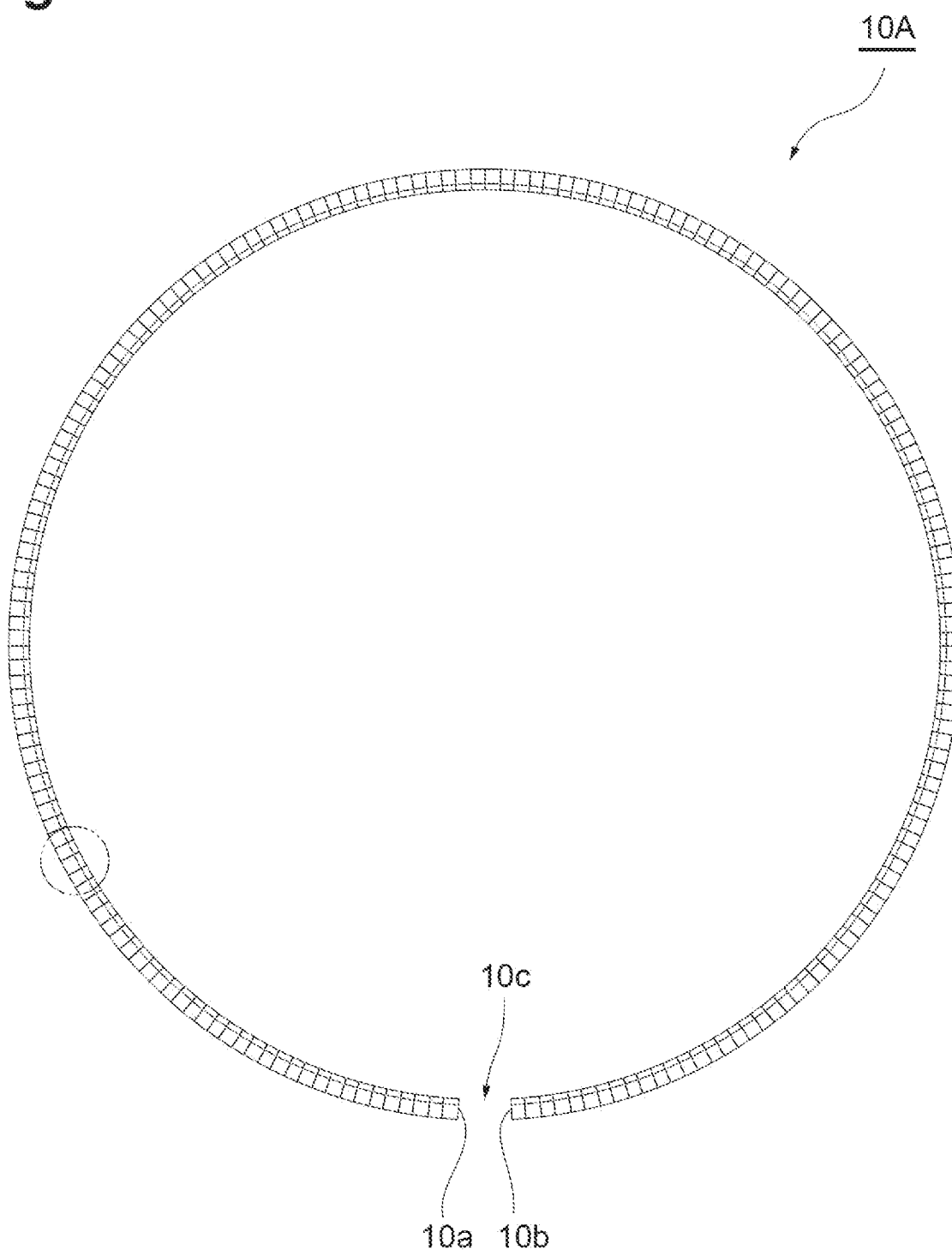
FIG. 1 is a plan view illustrating a first embodiment of a spacer expander according to the present disclosure.

FIG. 1 is a plan view of a spacer expander according to the present embodiment. As illustrated in the FIG. 1, the spacer expander 10A is annular and includes a joint part 10c constituted by two end surfaces 10a and 10b. The spacer expander 10A may be Manufactured, for example, by subjecting a steel plate to press processing (cutting and bending processing, and punching processing), or by plastically deforming a wire rod made of a spring steel while engaging it with a plurality of gears.

The spacer expander 10A may be one that has been subjected to a surface treatment from a viewpoint of enhancing wear resistance, resistance to adhesion, or the like. A film may be formed on a surface of the spacer expander 10A by, for example, an electroless plating method and an electrolytic plating method, a hard paint coating method, a physical vapor deposition (PVD) method, a chemical vapor deposition (CVD) method, or a sputtering method. As a material of the film, an amorphous carbon film, a chromium nitride film (CrN), a titanium nitride film (TiN) titanium carbide (TiC), titanium aluminum nitride (TiAlN), chromium nitride (CrN), TiCN, AlCrN, TiC, or plating made of a nickel alloy including nickel (Ni) or nickel phosphorus (NiP), or the like can be exemplified. Also, in addition to a film made of an inorganic material, a polymer film such as polyimide may be formed. Further, a polymer film in which a filler such as carbon fibers or glass fibers is incorporated may also be used.

Figure 2:
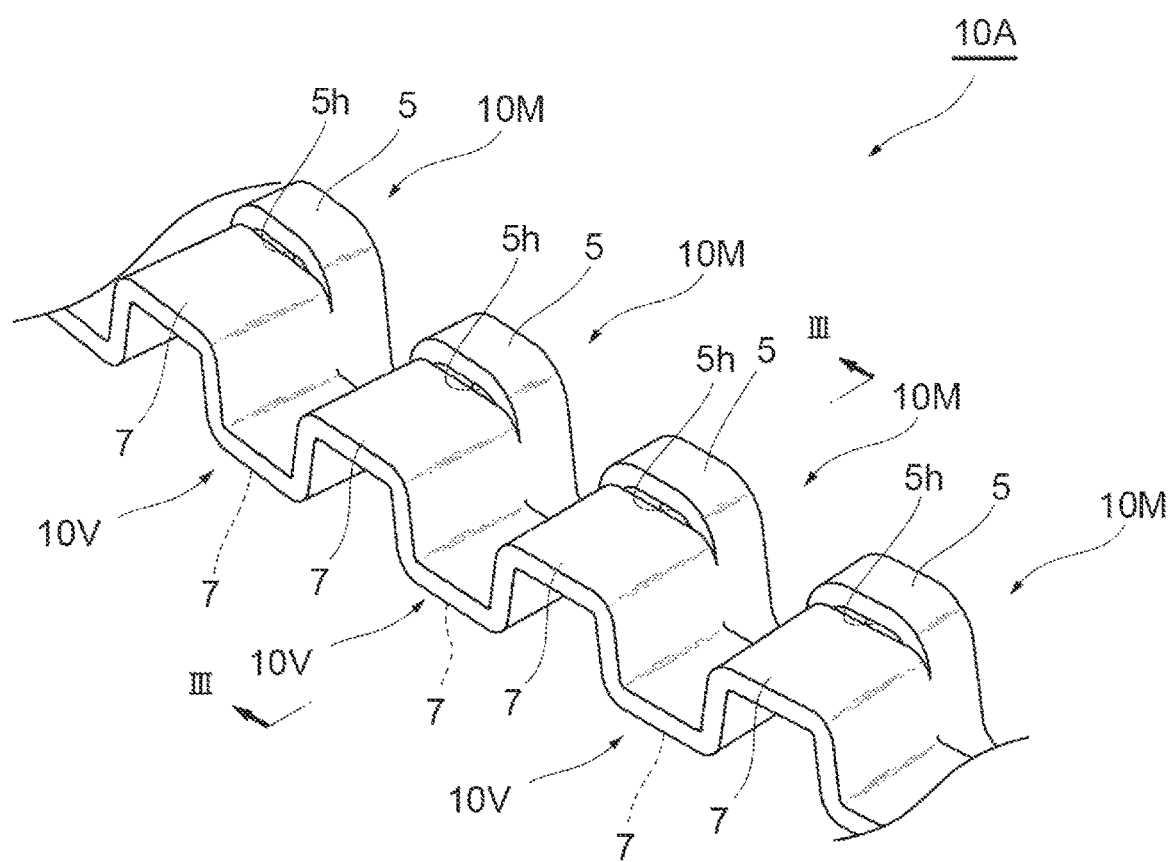
FIG. 2 is an enlarged perspective view illustrating a region surrounded by the dashed-dotted line illustrated in FIG. 1.
Figure 3:
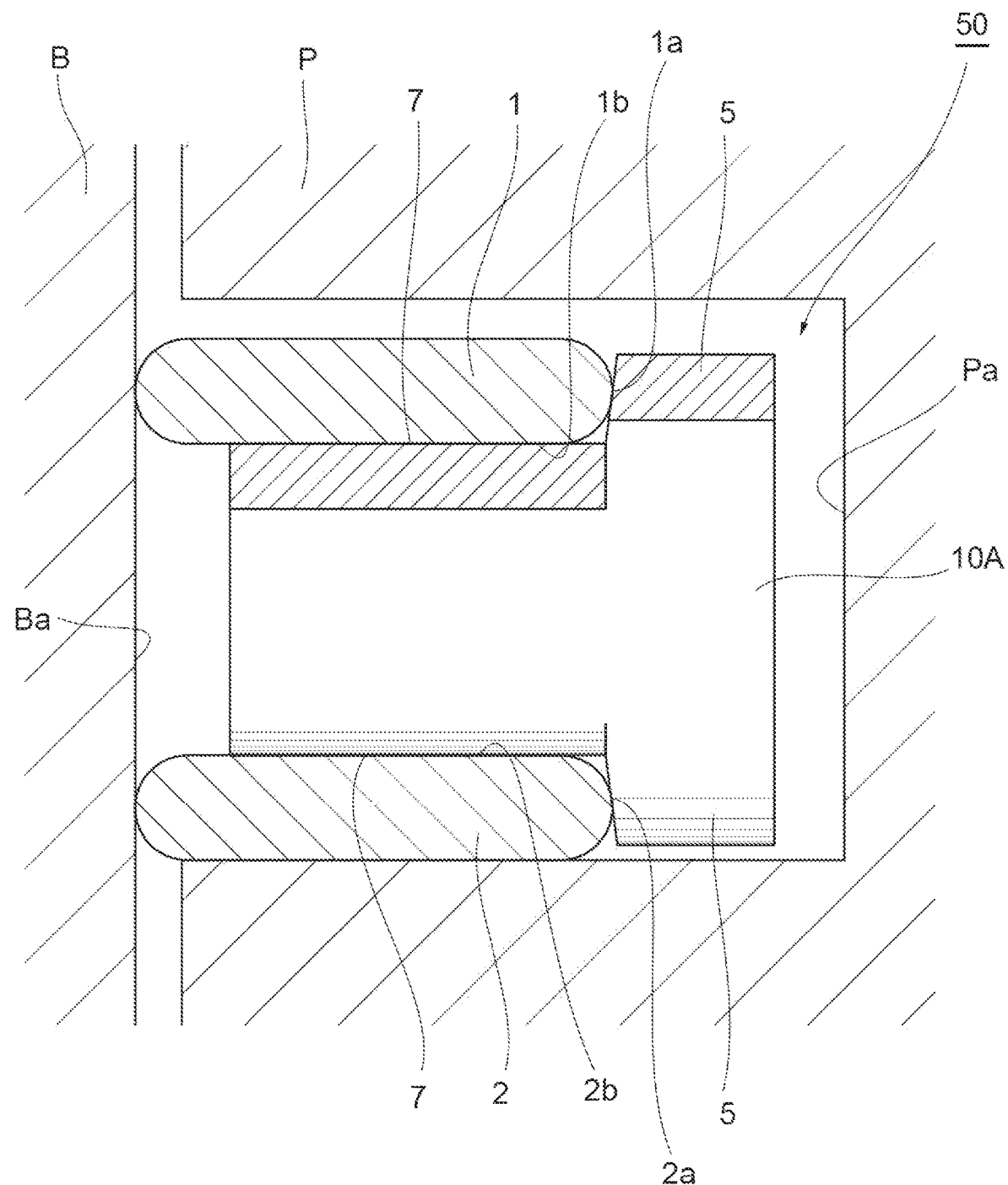
FIG. 3 illustrates a state in which an oil control ring including the spacer expander illustrated in FIG. 1 is mounted on a piston groove and is a cross-sectional view at a position corresponding to line III-III illustrated in FIG. 2.

FIG. 2 is an enlarged perspective view illustrating a region surrounded by the dashed-dotted line illustrated in FIG. 1. FIG. 3 illustrates a state in which an oil control ring 50 in which side rails 1 and 2 are combined with the spacer expander 10A is mounted in a groove Pa of a piston P, and is a cross-sectional view at a position corresponding to line III-III illustrated in FIG. 2. As illustrated in FIG. 3, the oil control ring 50 includes a pair of side rails 1 and 2 and the spacer expander 10A disposed between the pair of side rails 1 and 2. Outer circumferential portions of the side rails 1 and 2 are in contact with an inner surface Ba of a cylinder bore B. A thickness of the portion illustrated by hatching in FIG. 3 (plate thickness of the spacer expander) may be, for example, 0.1 mm to 0.7 mm. When this portion is made as thick as possible, a higher tension can be obtained and a sufficient contract area with respect to the side rails 1 and 2 can be secured, and thereby a higher wear reduction effect can be obtained. Also, in this case, a rigidity of each part of the spacer expander 10A to be described below can be enhanced. Further, as the side rails 1 and 2, conventionally known ones can be used. An outer circumferential surface shape and an inner circumferential surface shape of the side rail may be different from those of the side rails 1 and 2 according to the present embodiment, and may not necessarily be, for example, a cross-sectional shape having symmetry as illustrated in FIG. 3.

The spacer expander 10A includes a plurality of lug parts 5 with which inner circumferential surfaces 1a and 2a of the side rails 1 and 2 are in contact, and a plurality of rail facing parts 7 which face side surfaces 1b and 2b of the side rails 1 and 2. Each of the rail facing parts 7 is formed at a position on an outer circumferential side of each of the lug parts 5 and adjacent to each of the lug pans 5. In a state in which the side rails 1 and 2 are combined with the spacer expander 10A, since the inner circumferential surfaces 1a and 2a of the side rails 1 and 2 are in contact with the lug parts 5, and the rail lacing parts 7 face the side surfaces 1b and 2b of the side rails and 2, the lug part 5 is formed to be higher than the rail facing part 7. The spacer expander 10A includes openings 5h each formed by the lug part 5 and the rail facing part 7.

The spacer expander 10A has a shape in which ridge parts 10M and valley parts 10V are alternately connected, for example, when it is placed on a workbench. In the present embodiment, the lug part positioned at each of the ridge parts 10M (upper side in FIG. 2) of the spacer expander 10A and the lug part 5 positioned at each of the valley pans 10V (lower side in FIG. 2) thereof have substantially the same shape. Also, the rail facing part 7 positioned at the ridge part 10M (upper side in FIG. 2) of the spacer expander 10A and the rail facing part 7 positioned at the valley part 10V (lower side in FIG. 2) thereof have substantially the same shape. Therefore, when the spacer expander 10A placed on a workbench is inverted upside down, the ridge part 10M illustrated in FIG. 2 becomes the valley part 10V, and the valley part 10V becomes the ridge part 10M.

Hereinafter, the lug part 5 and the rail facing part 7 positioned at the ridge part 10M of the spacer expander 10A will be described, and description of the lug part 5 and the rail facing part 7 positioned at the alley pan 10V will be omitted. Further, the following description regarding a height such as a "highest position" in the lug part 5 and the rail facing part 7 is intended for the lug part 5 and the rail facing part 7 of the ridge part 10M positioned on an upper side in a state in which the spacer expander 10A is placed on a workbench, in this state, strictly speaking, it can also be said that the lug part 5 and the rail facing part 7 of the valley pan 10V positioned on a lower side may have to be referred to as, for example, a "lowest position" of the lug part 5 and the rail facing part 7, but, as described above, since the valley part 10V becomes the ridge part 10M when the spacer expander 10A is simply inverted upside down, the expression such as "highest position" is also applied to the lug part 5 and the rail facing part 7 of the valley part 10V in the present disclosure.

The lug part 5 is a portion with which the inner circumferential surface 1a of the side rail 1 is in contact. A shape of the lug part 5 preferably satisfies the condition represented by inequality (1), and more preferably satisfies the condition represented by inequality (2).

$$W/H \geq 1.5 \tag{1}$$

$$W/H \geq 1.7 \tag{2}$$

Figure 12A:
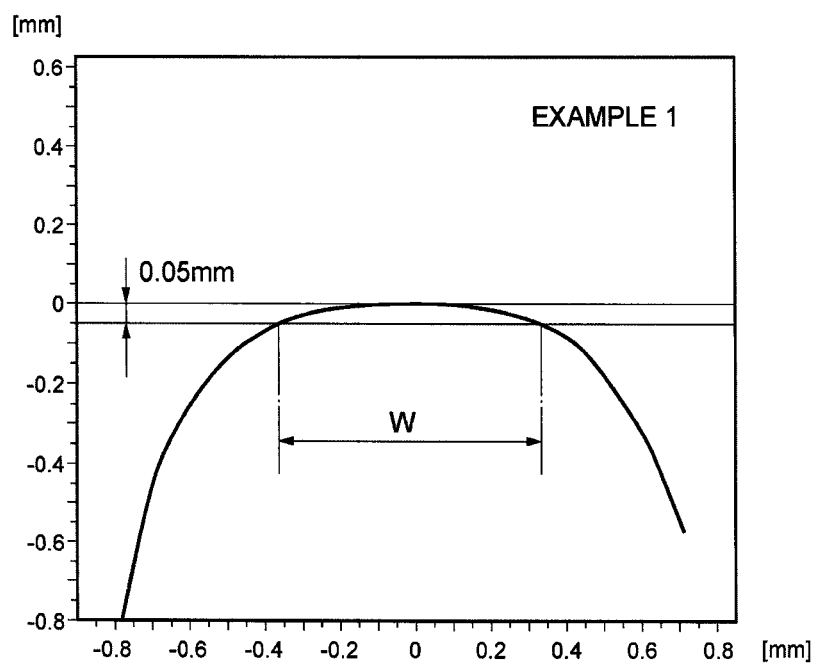
FIG. 12A is a view showing a width W of the lug part according to the example illustrated by the solid line in FIG. 11.
Figure 12B:
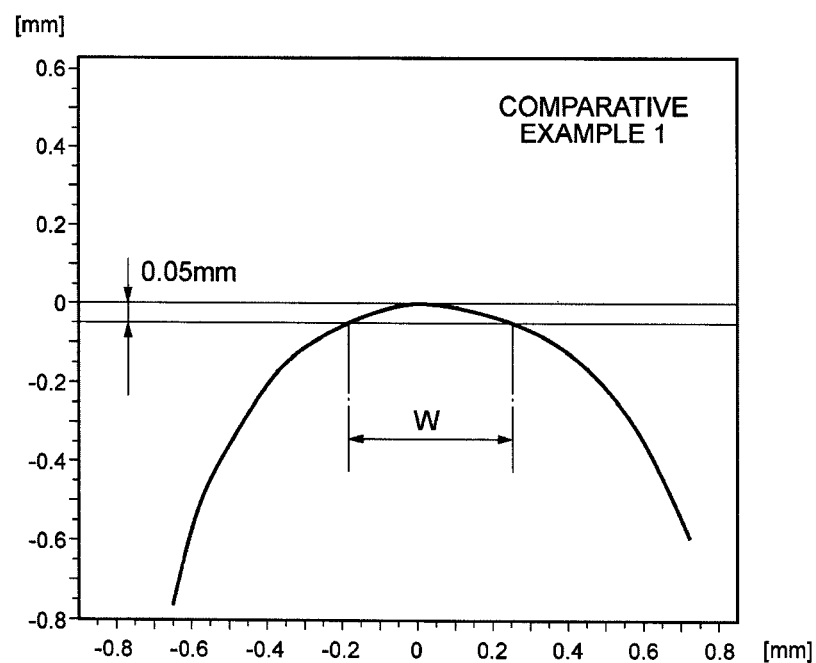
FIG. 12B is a view showing a width W of the lug part according to the comparative example illustrated by the broken line in FIG. 11.
Figure 13A:
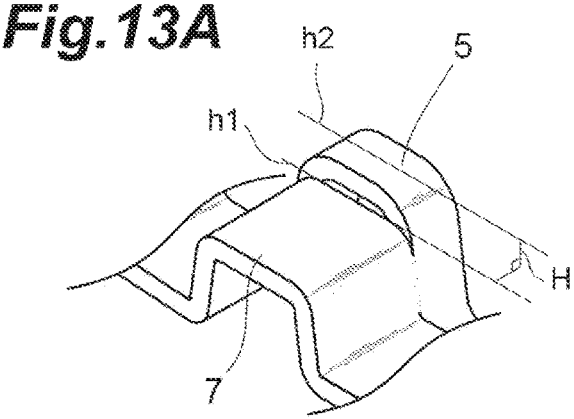
FIG. 13A is a view illustrating a height H of the lug part illustrated in FIG. 2.
Figure 13D:
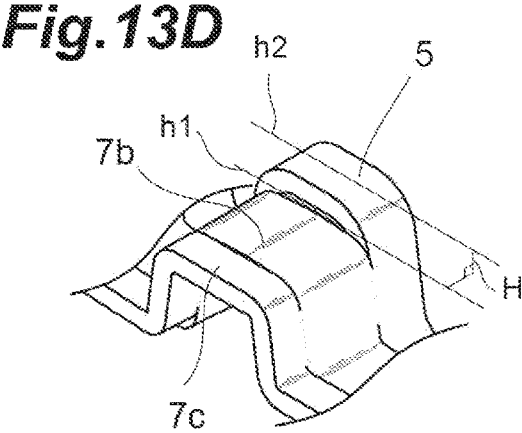
FIG. 13D is a view illustrating a height H of the lug part illustrated in FIG. 7.
Figure 13B:
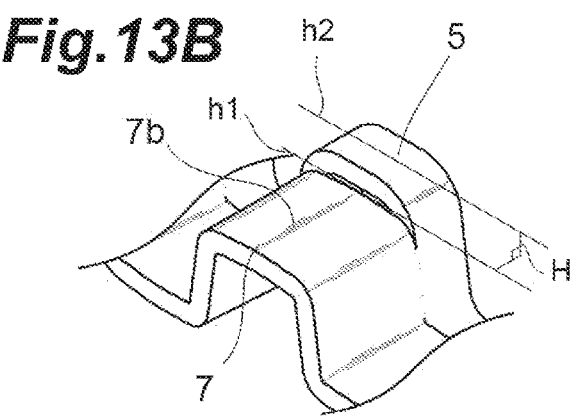
FIG. 13B is a view illustrating a height H of the lug part illustrated in FIG. 4.
Figure 13E:
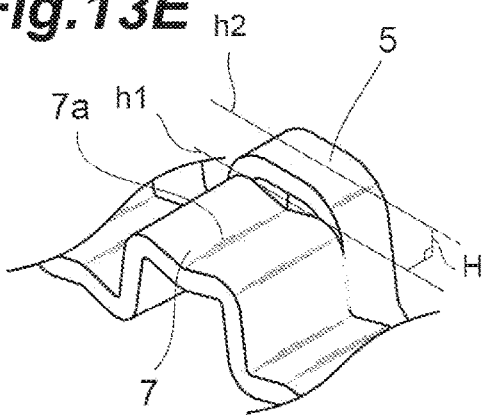
FIG. 13E is a view illustrating a height H of the lug part illustrated in FIG. 8.
Figure 13C:
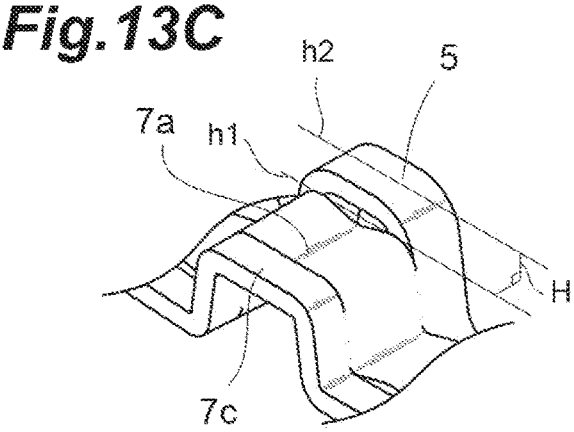
FIG. 13C is a view illustrating a height H of the lug part illustrated in FIG. 5.
Figure 13F:
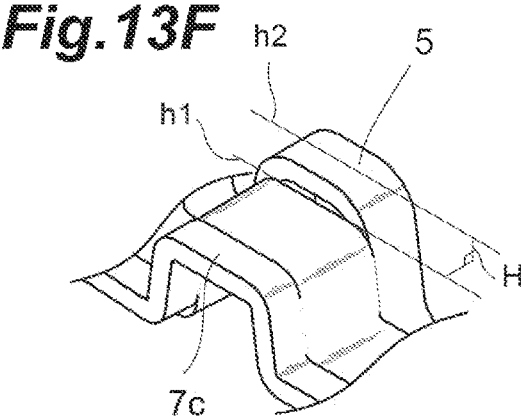
FIG. 13F is a view illustrating a height H of the lug part illustrated in FIG. 9.

W indicates a width (unit: mm) of the lug part 5 at a position 0.05 mm away from the highest position of the lug part 5 in a direction of the rail facing part 7 (thickness direction of the spacer expander 10A) (see FIG. 12A), and H indicates a height difference (unit: mm) between a highest position of a region on the rail facing part 7 adjacent to the lug part and a highest position of the lug part (see FIG. 13A). Further, the reason why the position 0.05 mm away from the highest position of the lug part 5 in the direction of the rail facing part 7 (on a lower side in the graph of FIG. 12A) is used in determining the position of the width W is that a frequency of the side rails 1 and 2 coming into contact with the position of the lug part 5 is presumed to be high at an initial stage of use of the oil control ring 50.

The lug part 5 having a W/H value of 1.5 or more can reduce an amount of wear due to a contact with the side rail 1 compared to the lug part 5 having the W/H value of less than 1.5. An upper limit of the W/H value may be, for example, 5.0 from a viewpoint of a tension generated from the spacer expander 10A. An apex part of the log part 5 may have a flat portion. Alternatively, the apex part of the lug part 5 may not have a flat portion. That is a shape of a side surface of the tug part 5 may be formed in a continuous curved surface, in other words, the side surface shape of the lug part 5 may be a shape in which curved surfaces having different curvatures are continuous. When such a configuration is employed, manufacture of the spacer expander can be facilitated, and a shape in which stress concentration does not easily occur during plastic determination can be made. Therefore, occurrence of breakage or the like can be reduced.

When the width W of the lug part 5 is, for example, 0.7 to 1.8 mm, the height H of the lug part 5 is preferably 0.2 to 0.75 mm. When the width W is, for example, 1.0 to 1.8 mm, the height H is preferably 0.2 to 0.65 mm. When the width W is, for example, 1.3 to 1.8 mm, the height H is preferably 0.35 to 0.7 mm. These values may be appropriately set according to a diameter of the spacer expander 10A, a strength of the material, a pitch of the lug parts, or the like.

As described above, since a shape in which the height of the lug part is suppressed compared to the width of the lug part is made when the W/H value is 1.5 or more (the lug part 5 is relatively flat), a mechanical strength of the lug part of the spacer expander 10A can be increased. Therefore, even when the spacer expander 10A receives an external force according to a reciprocating motion of the piston, a tension of the spacer expander 10A can be stably transmitted to the side rails 1 and 2, and postures of the side rails 1 and 2 supported by the spacer expander 10A can be maintained in a stable state. Furthermore, an oil scraping performance due to the side rails 1 and 2 is made stable, and as a result, oil consumption also is made sable. Also, in a case of a manufacturing method in which the spacer expander 10A is obtained by plastically deforming a plate or wire rod, a volume of the shape changed by the plastic deformation increases as the height of the lug part 5 increases, and this causes manufacturing difficulty to increase, but since a height compared to a width is suppressed in the lug, part 5 according to the present embodiment, such a manufacturing difficulty is lower than that in a conventional spacer expander.

As described above, the height H of the lug part 5 is a height difference between the highest position of the region on the rail facing part 7 adjacent to the lug part 5 and the highest position of the lug part 5. A search range of the "highest position" on the rail facing part 7 is within a range of the region adjacent to the lug part 5 on the rail facing part 7. FIG. 13A illustrates a method of obtaining the height difference (the height H of the lug part 5) between the highest position of the region on the rail facing part 7 adjacent to the lug part 5 and the highest position of the lug part 5 in the spacer expander 10A according to the present embodiment. Further, FIGS. 13B to 13F illustrate methods of obtaining the height H of the lug part 5 of the spacer expander according to other embodiments to be described below. In all of the figures, a straight line passing through the highest position of the lug part 5 is illustrated as h2, and a straight line passing through the highest position of the region on the rail facing part 7 adjacent to the lug part is illustrated as h1. The straight lines h1 and h2 are both straight lines parallel to a tangential direction of the spacer expander 10 at each of ridge portions thereof.

Further, when a protruding part (flat portion 7c) that is in contact with the side surface of the side rail is provided at an outer circumferential end that is away from the lug part 5 as in a third embodiment to be described below, a place having a highest position is searched for in a region other than the protruding part in the rail facing part 7. In this case, in a method of searching for the highest position on the rail facing part 7, with an envelope curve that connects highest positions of the lug parts 5 on a plurality of ridge parts with a substantially straight line as a reference, a position having a smallest distance from the envelope curve in a region of the rail facing part 7 adjacent to the log part 5 is set as the highest position.

The rail facing part 7 according to the present embodiment is formed flat surface as illustrated in FIG. 2. The side rails 1 and 2 are in contact with the flat surface, and thereby the side rails 1 and 2 are supported.

Second Embodiment

Figure 4:
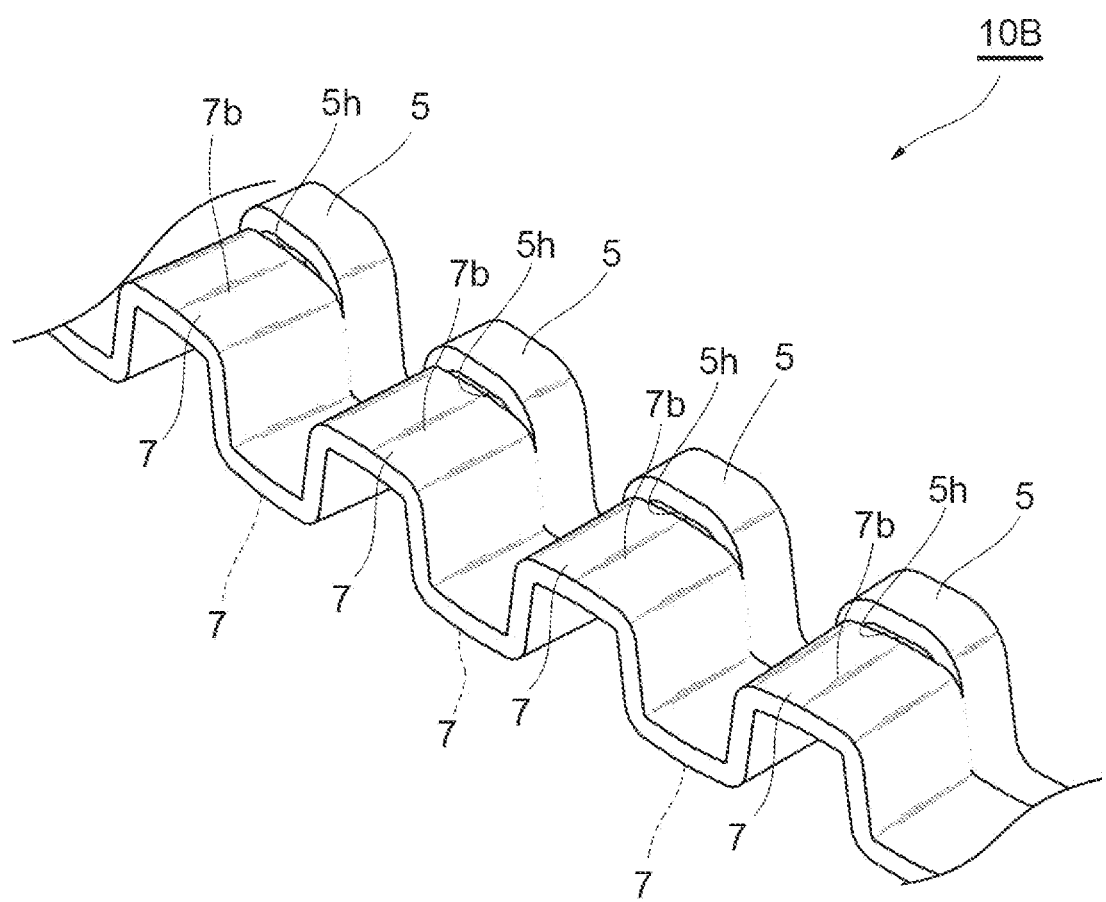
FIG. 4 is a perspective view illustrating part of a second embodiment of the spacer expander according to the present disclosure.

A spacer expander 10B according to the present embodiment has the same configuration as the spacer expander 10A according to the first embodiment except that the rail facing part 7 has a raised portion 7b formed to extend in a radial direction instead of having a flat surface (see FIG. 4). When the rail facing part 7 includes the raised portion 7b, engine oil and foreign matter contained therein accumulating on a surface of the rail facing part 7 can be sufficiently reduced, and adhesion between the rail facing part 7 and the side rail 1 can be sufficiently reduced. In the present embodiment, the raised portion 7b extends to an end portion on an outer circumferential side of the spacer expander 10B.

Third Embodiment

Figure 5:
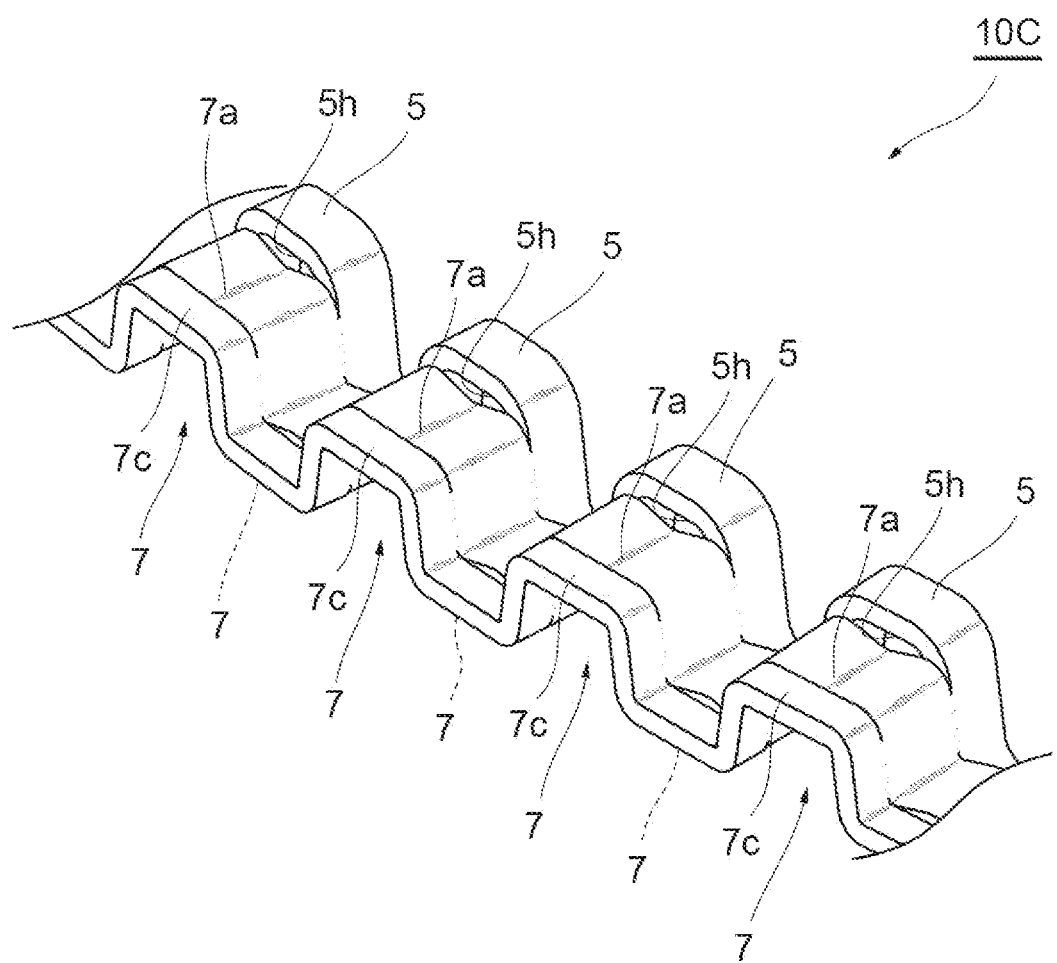
FIG. 5 is a perspective view illustrating part of a third embodiment of the spacer expander according to the present disclosure.

A spacer expander 10C according to the present embodiment has the same configuration as the spacer expander 10A according to the first embodiment except that the rail facing part 7 has the flat portion 7c on an outer circumferential side thereof and a recess 7a formed to extend in a radial direction between the lug part 5 and the flat portion 7c instead of having a flat surface (see FIG. 5). When such a configuration is employed, combustion products such as sludge can be prevented from accumulating between the rail facing part 7 and the side rails 1 and 2. This also contributes to the reduction of adhesion therebetween. A depth of the recess 7a (height difference between a highest position of the rail facing part 7 and a lowest position of the recess 7a) may be, for example, 50 to 500 μm. The flat portion 7c is formed along an edge portion on the outer circumferential side of the spacer expander 10C. When a height of the flat portion 7c is formed to be lower than that of the lug part 5 and higher than that of the other portion of the rail facing part 7, a gap is formed between the other portion of the rail facing part 7 and the side rail 1 in a state in which the side rail 1 is in contact with the flat portion 7c. Further, the flat portion 7c is also referred to as a "protruding part," and the region other than the flat portion 7c on the rail facing part 7 (a portion connecting the lug part 5 and the flat portion 7c) is also referred to as an "intermediate part." When the rail facing part 7 includes the flat portion 7c, spaces are formed between the side surfaces 1b and 2b of the side rails 1 and 2 and the spacer expander 10C, an oil scraped off from the cylinder bore by the side rails 1 and 2 is scraped off between the lug part 5 and the rail facing part 7, and thereby an effect capable of causing the oil to efficiently flow to an inner circumferential side of the spacer expander 10C is achieved.

Figure 6A:
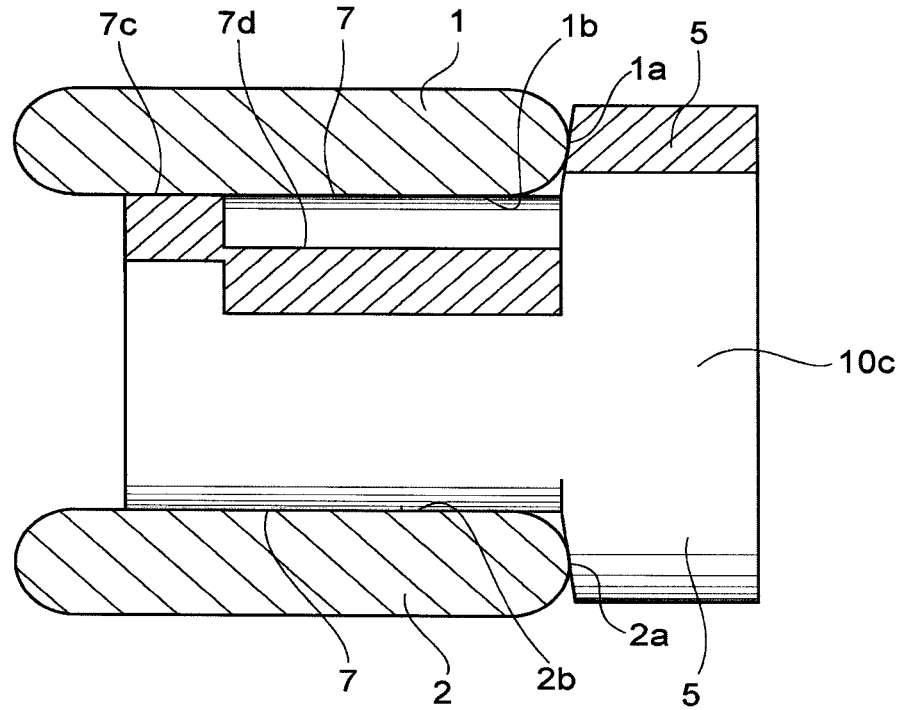
FIGS. 6A and 6B are cross-sectional views of the spacer expander illustrated in FIG. 5 and side rails mounted thereon and illustrate aspects of spacer expanders different from each other.
Figure 6B:
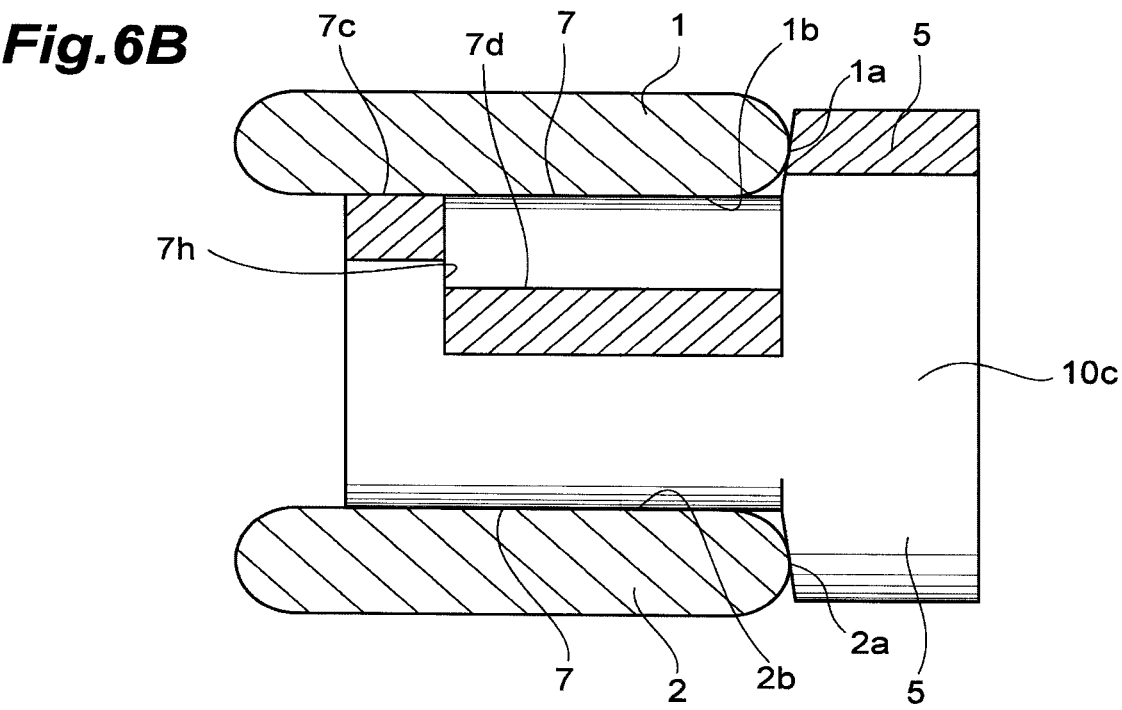

FIGS. 6A and 6B are cross-sectional views of the spacer expander 10C illustrated in FIG. 5 and the side rails 1 and 2 mounted thereon and illustrate aspects different from each other. In both aspects, a step is provided between the flat portion 7c and the other region 7d (intermediate part) on the rail facing part 7. In the aspect illustrated in FIG. 6A, the flat portion 7c and the other region 7d are not disconnected in the rail facing part 7, and the members are continuous. That is, no through hole is formed in this portion. On the other hand, in the aspect illustrated in FIG. 6B, the flat portion 7c and the other region 7d are disconnected in the rail facing part 7, and a through hole 7h is formed in this portion. The through hole 7h may or may not be formed, but in a case of use in an environment in which foreign matter tends to be present such as in a diesel engine, there is a likelihood that the through hole 7h will become blocked by foreign matter, and there are cases in which a degree of aging deterioration of tension increases due to provision of the through hole 7h. When there are these concerns due to an environment of an internal-combustion engine, it is preferable to use a spacer expander in which the through hole 7h is not formed as illustrated in FIG. 6A. On the other hand, when the through hole 7h is provided, there is a greater opportunity for oil scraped off from the cylinder bore to efficiently flow to the inner circumferential side of the spacer expander 10C. Further, the through hole 7h may be one formed by, for example, a deepest portion of the recess 7a and the flat portion 7c.

Fourth Embodiment

Figure 7:
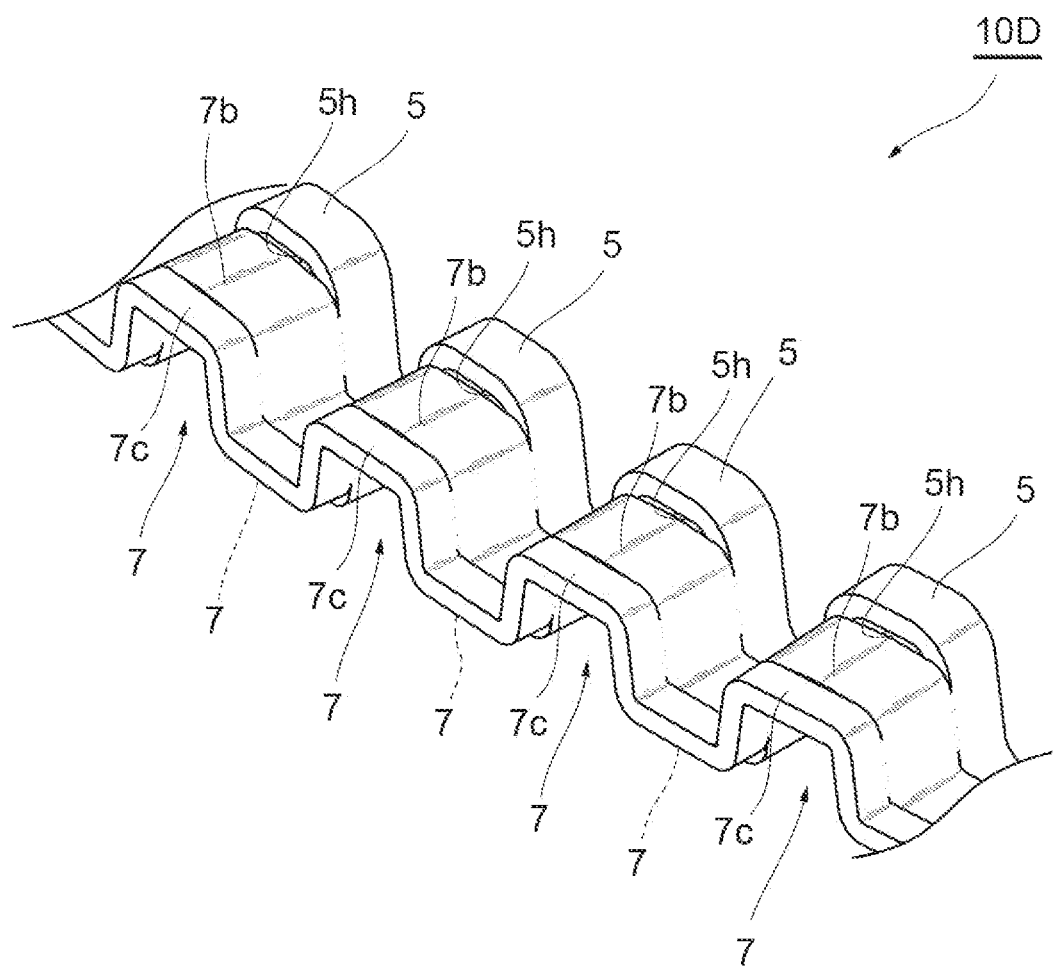
FIG. 7 is a perspective view illustrating part of a fourth embodiment of the spacer expander according to the present disclosure.

A spacer expander 10D according to the present embodiment has the same configuration as the spacer expander 10A according to the first embodiment except that the rail facing part 7 has a flat portion 7c on an outer circumferential side and a raised portion 7b formed to extend in a radial direction between the lug, part 5 and the flat portion 7c instead of having a flat surface (see FIG. 7). The flat portion 7c is formed along an edge portion on the outer circumferential side of the spacer expander 10D. In a state in which the side rails 1 and 2 are combined with the spacer expander 10D since the inner circumferential surfaces 1a and 2a of the side rails 1 and 2 are in contact with the lug parts 5, and the side surfaces 1b and 2b of the side rails 1 and 2 face the flat portions 7c of the rail facing parts 7, the flat portions 7c are each formed to be lower than each of the lug parts 5.

Fifth Embodiment

Figure 8:
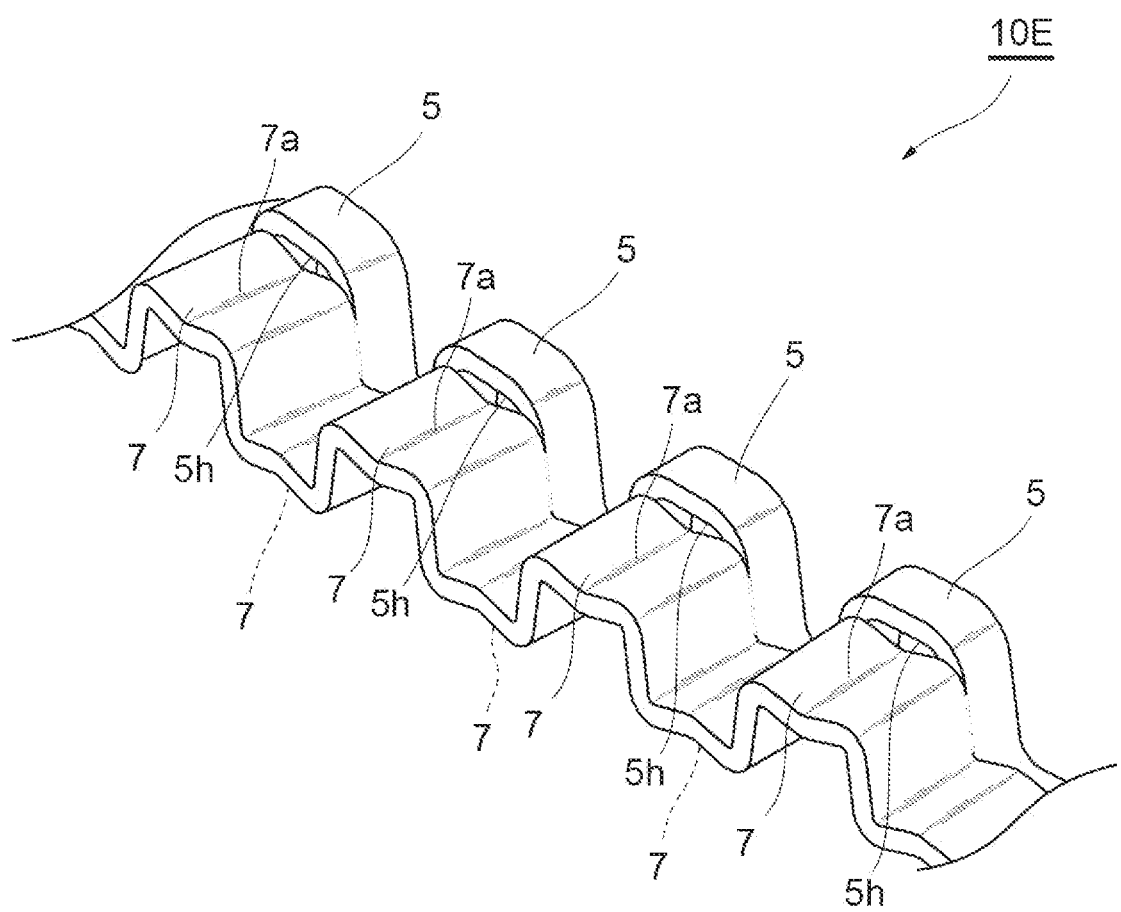
FIG. 8 is a perspective view illustrating part of a fifth embodiment of the spacer expander according to the present disclosure.

A spacer expander 10E according to the present embodiment has the same configuration as the spacer expander 10A according to the first embodiment except that the rail facing part 7 has a recess 7a extending in a radial direction instead of having a flat surface (see FIG. 8). In the present embodiment, the recess 7a extends to an end portion on an outer circumferential side of the spacer expander 10E. The sparer expander 10E having such a configuration has an advantage that it can be easily processed by plastic deformation compared to the spacer expanders according to the first to fourth embodiments described above.

Sixth Embodiment

Figure 9:
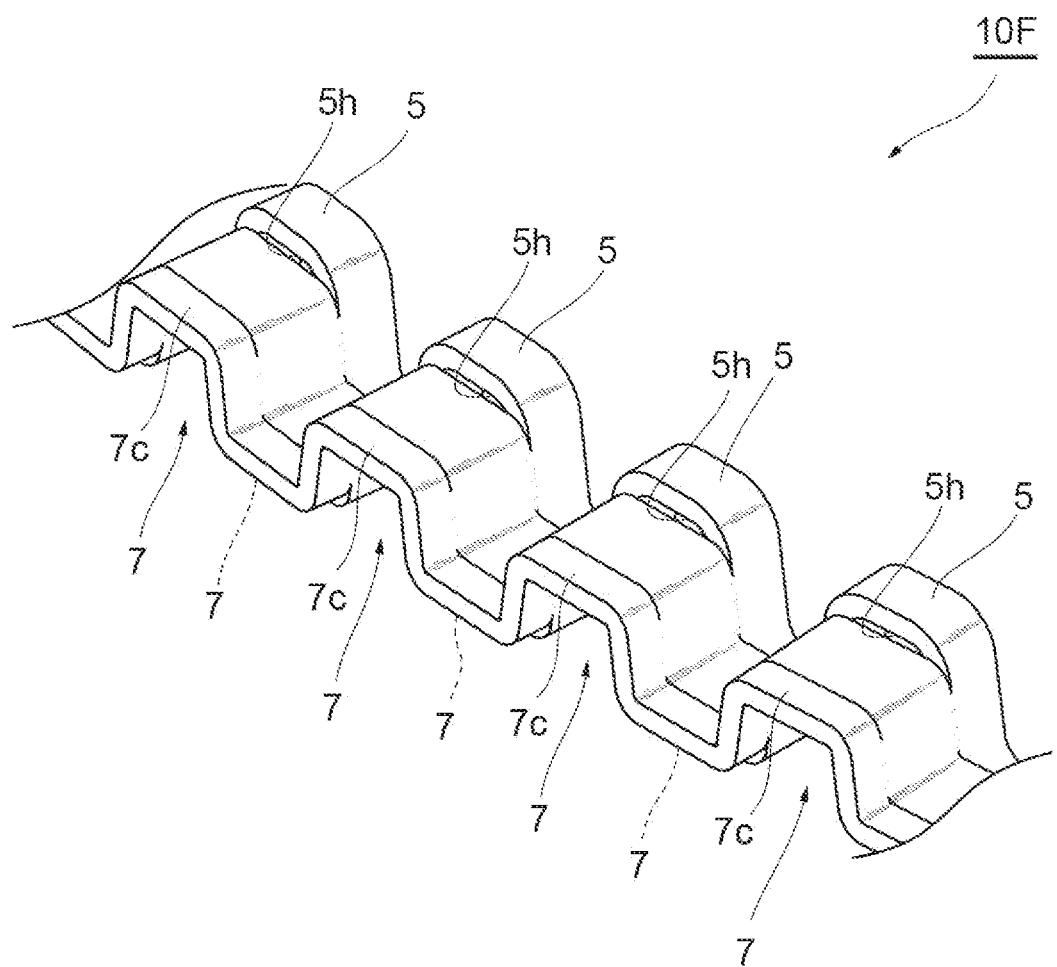
FIG. 9 is a perspective view illustrating part of a sixth embodiment of the spacer expander according to the present disclosure.

A spacer expander 10F according to the present embodiment has the same configuration as the spacer expander 10A according to the first embodiment except that the rail facing part 7 has a flat portion 7c on an outer circumferential side instead of having a flat surface (see FIG. 9). The spacer expander 10F having such a configuration has an advantage that it can be easily processed by plastic determination as in the spacer expander according to the fifth embodiment described above.

While embodiments of the present disclosure have been described above in detail, the present invention is not limited to the above embodiments. For example, although a case in which the surface of the lug part 5 with which the inner circumferential surface 1a of the side rail 1 is in contact is flat has been exemplified in the above-described embodiment, the surface of the lug part 5 with which the inner circumferential surface 1a is in contact may have a plurality of protruding parts 5b extending in a thickness direction of the spacer expander (height direction of the lug part 5), and these protruding parts 5b may be formed to be aligned in a width direction of the lug part 5.

Figure 10A:
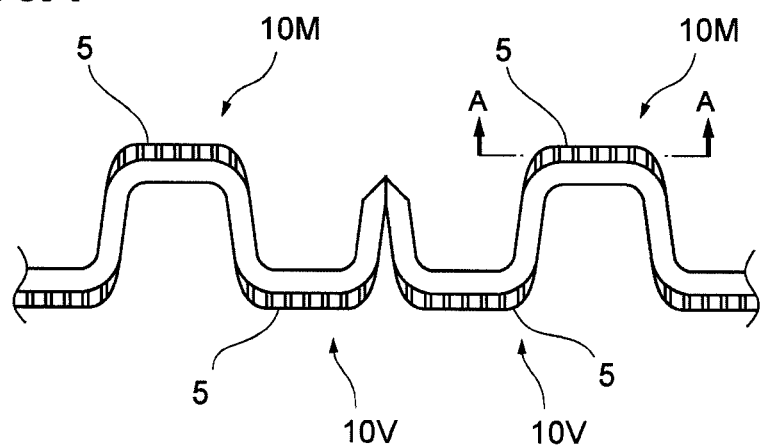
FIG. 10A is a view illustrating an example of a lug part having a protruding part on a surface with which an inner circumferential surface of a side rail is in contact.
Figure 10B:
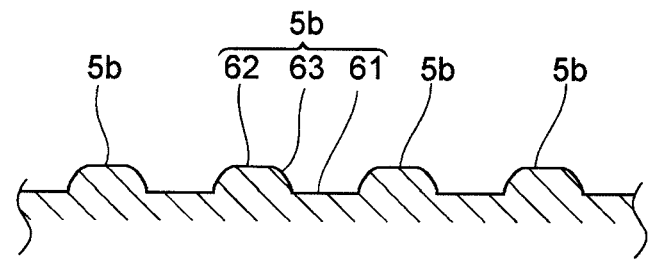
Figure 10C:
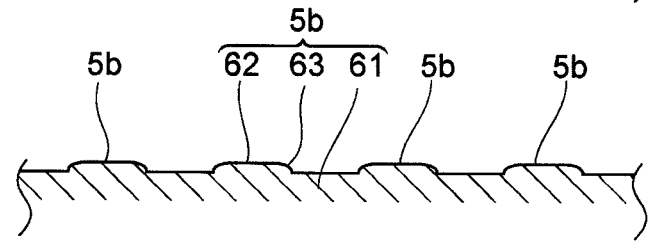

FIG. 10A is a view of a spacer expander from an outer circumferential side and has a waveform shape (ridge parts and valley parts) in an axial direction, in which the lug part 5 of the ridge part 10M pressing the side rail 1 on one side and the lug part 5 of the valley part 10V pressing the side rail 2 on the other side are formed. An irregular part having a circumferential concave-convex shape in which recessed parts and protruding parts extend in a substantially axial direction is formed in the lug part 5. When a contact area of the protruding surface is reduced to increase a contact surface pressure, the side rail can be prevented from rotating independently. FIGS. 10B and 10C are cross-sectional views along line A-A in FIG. 10A, in which FIG. 10B is a cross-sectional view illustrating an aspect in which the protruding part is high, and FIG. 10C is a cross-sectional view illustrating an aspect in which the protruding part is low. As illustrated in these figures, the protruding part 5b is formed to protrude from a recessed surface 61 and includes a protruding surface 62 and a side surface 63 that connects the protruding surface 62 and the recessed surface 61.

In one lug part 5, preferably at least five (more preferably seven) protruding parts 5b are formed to be aligned in a width direction of the lug part 5. The protruding part 5b may be formed by the recessed part by, for example, cutting between two adjacent protruding parts 5b.

In the above embodiments, a case in which the lug parts 5 and the rail facing parts 7 all have substantially the same shape is assumed, but these may not necessarily have substantially the same shape. Also, in the plurality of lug parts 5 formed on one side surface side of the spacer expander, the lug parts 5 may nut all satisfy the condition represented by inequality (1) or inequality (2). For example, at least half of the plurality of lug parts 5 formed on one surface side may satisfy the condition represented by inequality (1) or inequality (2).

EXAMPLES

Example 1

Figure 11:
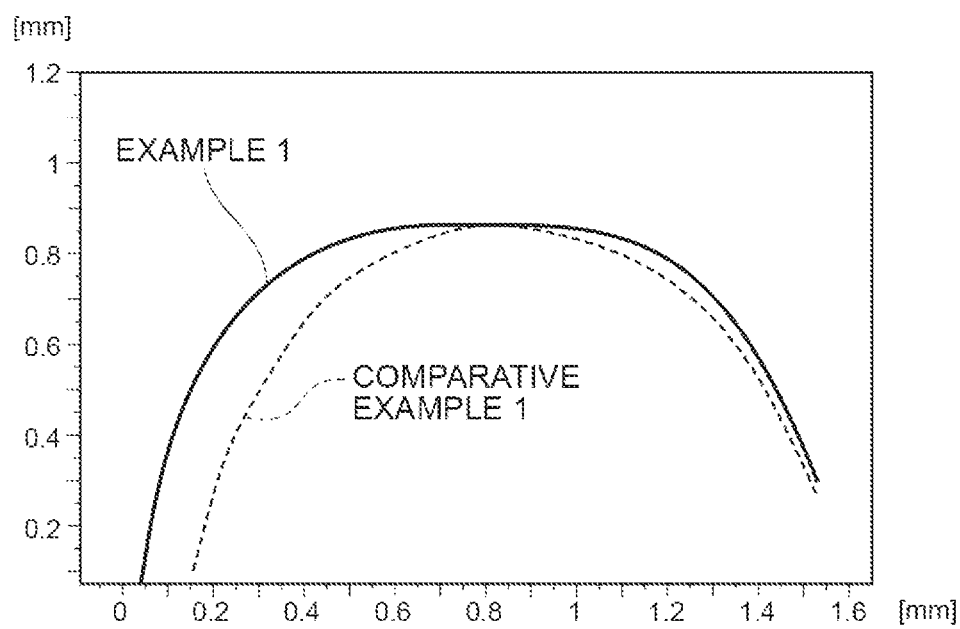
FIG. 11 is a graph showing results of outline shape measurement (circumferential direction) for lug parts of spacer expanders according to an example and a comparative example.

A spacer expander (manufactured of SUS304) and a pair of side rails (manufactured of SUS304) were prepared, and an oil control ring (nominal diameter: 83 mm, combination width dimension; 2.0 mm, combination thickness; 2.3 mm) was fabricated. Further, as an aspect of the spacer expander, a spacer expander including a rail facing part having a recessed portion (see FIG. 8) and a lug part having six protruding parts (see FIG. 10) was employed. A shape of the lug part was measured using an outline shape measuring machine (manufactured by Tokyo Seimitsu Co., Ltd.). From this measurement result, a height H and a width W of the lug part were obtained (see FIG. 11). A value of a ratio (W/H) of the width W to the height H of the lug part was 2.1.

Comparative Example 1

A spacer expander (manufactured of SUS304) and a pair of side rails (manufactured of SUS304) were prepared, and an oil control ring (nominal diameter: 83 mm, combination width dimension: 2.0 mm, combination thickness: 2.3 mm) was fabricated. Further, as an aspect of the spacer expander, a spacer expander including a rail facing part having a recessed portion and a flat portion (see FIG. 5) and a lug part having three protruding parts (see FIG. 10) was employed, A shape of the lug part was measured in the same manner as in example 1. From this measurement result, a height H and a width W of the lug part were obtained (see FIG. 11). A value of a ratio (W/H) of the width W to the height H of the lug part was 1.45.

<Measurement of Amount of Wear of Lug Part>

The ring of example 1 or comparative example 1 was mounted on a groove for an oil control ring of a diesel engine, and sliding conditions between the spacer expander and the side rails that occur when the engine was operated under the following conditions wore roughly reproduced. A sliding test was performed, and a shape of the lug part before and after the sliding test was measured, and thereby an amount of wear (mm) of the lug part after driving was obtained (see FIG. 14).

Engine: A water-cooled four-cycle diesel engine with a supercharger attached (3.0 L displacement, six cylinders)

Rotation speed; 4000 rpm

Load; Full load (Wide open throttle)

Operation time; 500 hours

Figure 14:
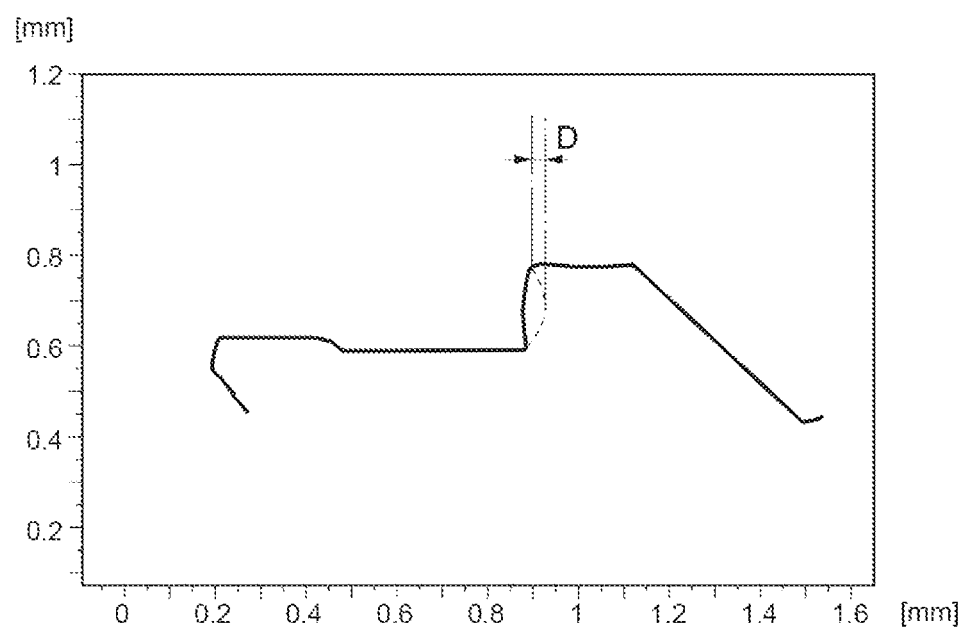
FIG. 14 is a graph showing results of outline shape measurement (diameter direction) for a lug part, and is a graph illustrating a shape before a wear test (solid line) and a shape after the wear test (broken line).

In FIG. 14, the solid line illustrates a shape of the spacer expander (cross section in a radial direction) before the engine is operated, and the broken line illustrates a shape of the lug part alter the sliding test. The distance D in FIG. 14 is an amount of wear (mm).

When it is assumed that an amount of wear of the lug part in comparative example 1 was 100, an amount of wear of the lug part in example 1 was 20, and a reduction the amount of wear of 80% was ascertained.

<Evaluation of Side Rail Rotation>

Figure 15:
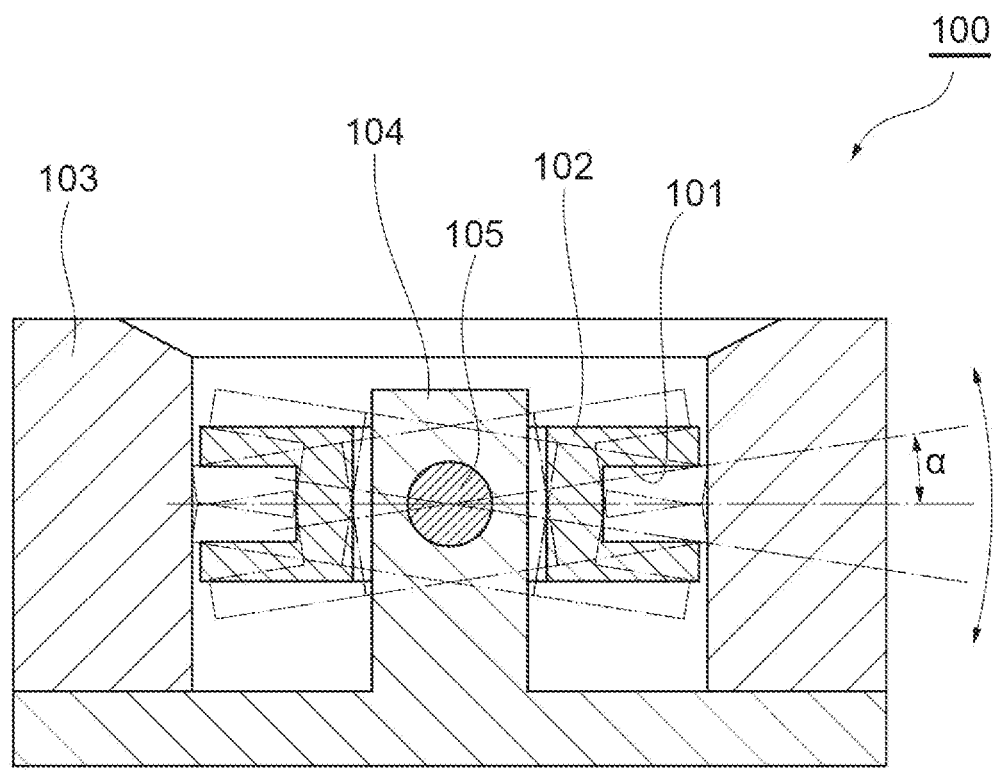
FIG. 15 is a schematic view illustrating a configuration of a device used for evaluating rotation of side rails with respect to a spacer expander.

Side rail independent rotation (rotation of side rails with respect to a spacer expander) was evaluated using the device illustrated FIG. 15. The device 100 illustrated in FIG. 15 evaluates independent rotation of side rails by mounting an oil control ring on a holder (pseudo piston) 102 having a pseudo oil ring groove 101 and swinging it in a cylinder (pseudo cylinder) 103 with a fulcrum 105 provided in a support column 104 as a center. Further, a central axis of the holder 102 and a central axis of the cylinder 103 were disposed to be shifted from each other. Thereby, the evaluation was performed under strict conditions as compared with a case in which both the central axes were not shifted from each other. The test was performed such that an oil control ring to which two upper and lower side rails were assembled with them shifted by 30° in opposite directions from a joint (joint part) position of the spacer expander was mounted on the holder 102 with respect to the joint position of the spacer expander, a swinging motion was performed for 10 minutes at each of swinging angles α at intervals of 0.5° from 0.5° to 7.5° at a speed of 10 reciprocations per second, and then a side rail independent rotation preventing ability was evaluated on the basis of a swinging angle at which independent rotation of the side rail occurred. It can be evaluated that the side rails have a structure in which rotation becomes more difficult as the swinging angle at which the rotation starts becomes larger. The side rail independent rotation start angle of the oil control ring in example 1 was 7.5° or more, whereas the side rail independent rotation start angle of the oil control ring in comparative example 1 was 6.0°.

<Relationship between W/H Value and Amount of Wear of Lug part>

Figure 16:
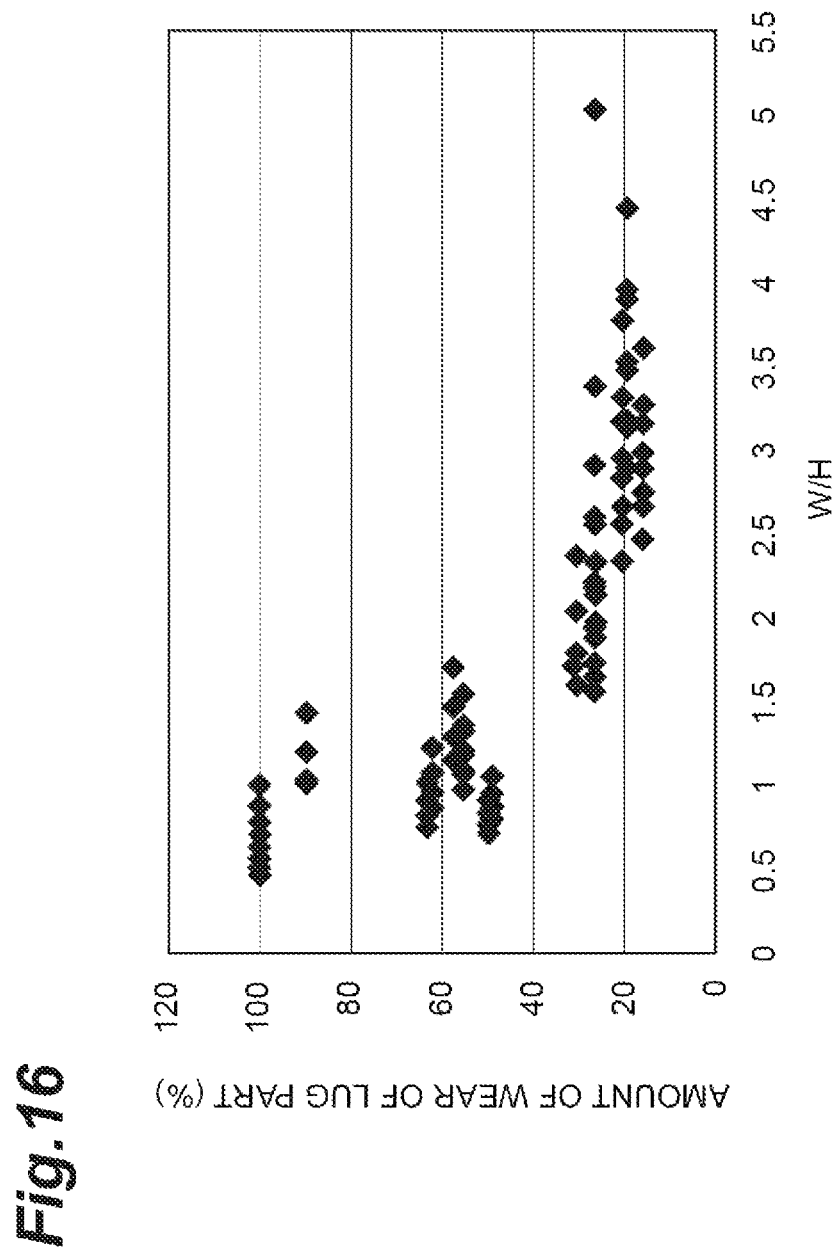
FIG. 16 is a graph in which a relationship between a W/H value and an amount of wear of a lug part is plotted.

Spacer expanders (80 types in total) with the following conditions were fabricated and amounts of wear of the lug parts were measured in the same manner as in example 1 described above. The results (values relative to the amount of wear of comparative example 1 described above) are shown in FIG. 16. As illustrated in FIG. 16, when the W/H ratio was 1.5 or more, the amount of wear could be significantly reduced compared to comparative example 1.

Ring outer diameter: Φ30 to 240 mm.
W/H ratio: 0.47 to 5.1

INDUSTRIAL APPLICABILITY

According to the present disclosure, an oil control ring in which wear of a lug part due to contact with a side rail can be reduced, and a spacer expander applicable thereto are provided.

REFERENCE SIGNS LIST 1, 2 Side rail (a pair of side rails)
1a, 2a Inner circumferential surface of side rail
1b, 2b Side surface of side rail
5 Lug part
5b Protruding part
5h Opening
7 Rail facing part
7a Recess
7b Raised portion
7c flat portion
10A to 10E Spacer expander
10M Ridge part
10V Valley part
50 Oil control ring

The invention claimed is:
1. An oil control ring comprising:
a pair of side rails; and
a spacer expander disposed between the pair of side rails,
wherein the spacer expander comprises a plurality of sets, each set comprising a lug part and a rail facing part, and
wherein for each set:
the lug part is in contact with an inner circumferential surface of either of the pair of the side rails,
the rail facing part is provided adjacent to the lug part and faces a side surface of either of the pair of the side rails, and
the lug part satisfies the following condition:

$$1.7 \leq W/H \leq 5.0$$

wherein in the condition, W is a width of the lug part at a position 0.05 mm away from a highest position of the lug part in a direction towards the rail facing part, and H is a height difference between a highest position of a region on the rail facing part adjacent to the lug part and the highest position of the lug part.
2. The oil control ring according to claim 1, wherein the rail facing part comprises a recess which is formed to extend in a radial direction.
3. The oil control ring according to claim 1, wherein the rail facing part comprises a raised portion which is formed to extend in a radial direction.
4. The oil control ring according to claim 1,
wherein the rail facing part comprises a flat portion which contacts the side surface of the side rails, and
wherein the flat portion is formed along an edge portion of the rail facing part on an outer circumference of the spacer expander.
5. The oil control ring according to claim 1, wherein the spacer expander comprises an opening formed by the lug part and the rail facing part.
6. The oil control ring according to claim 1, wherein the lug part comprises a protruding part which is formed on a surface which contacts the inner circumferential surface of the side rail, the protruding part extending in a radial direction.
7. The oil control ring according to claim 6, wherein at least five protruding parts are formed to be aligned in one lug part.
8. The oil control ring according to claim 1, wherein the spacer expander has been subjected to a surface treatment.
9. The oil control ring according to claim 1, wherein the oil control ring is used for a diesel engine.
10. The oil control ring according to claim 1,
wherein the rail facing part comprises a recess which is formed to extend in a radial direction,
wherein the rail facing part comprises a flat portion which contacts the side surface of the side rails, and
wherein the flat portion is formed along an edge portion of the rail facing part on an outer circumference of the spacer expander.
11. The oil control ring according to claim 1,
wherein the rail facing part comprises a raised portion which is formed to extend in a radial direction,
wherein the rail facing part comprises a flat portion which contacts the side surface of the side rails, and wherein the flat portion is formed along an edge portion of the rail facing part on an outer circumference of the spacer expander.

12. The oil control ring according to claim 4,
wherein the rail facing part comprises the flat portion and a non-flat portion, and
wherein the flat portion and the non-flat portion are separated by a through hole.

13. The oil control ring according to claim 12, wherein a height of the flat portion is lower than a height of the lug part and higher than a height of the non-flat portion.

14. The oil control ring according to claim 4,
wherein the rail facing part comprises the flat portion and a non-flat portion, and
wherein the flat portion and the non-flat portion are joined together without any through holes between the flat portion and the non-flat portion.

15. The oil control ring according to claim 14, wherein a height of the flat portion is lower than a height of the lug part and higher than a height of the non-flat portion.

16. A spacer expander disposed between a pair of side rails comprising a plurality of sets, each set comprising a lug part and a rail facing part,
wherein for each set:
the lug part is in contact with an inner circumferential surface of either of the pair of the side rails,
the rail facing part is provided adjacent to the lug part and faces a side surface of either of the pair of the side rails, and
the lug part satisfies the following condition:

$$1.7 \leq W/H \leq 5.0$$

wherein in the condition, W is a width of the lug part at a position 0.05 mm away from a highest position of the lug part in a direction towards the rail facing part, and H is a height difference between a highest position of a region on the rail facing part adjacent to the lug part and the highest position of the lug part.

* * * * *